US005372469A

United States Patent [19]

Kobayashi

[11] Patent Number: 5,372,469

[45] Date of Patent: Dec. 13, 1994

[54] PARCEL CART FOR COIL-SHAPED OBJECTS

[75] Inventor: Takechiyo Kobayashi, Nagoya, Japan

[73] Assignee: Kobayashi Hansokiki Co., Ltd., Aichi, Japan

[21] Appl. No.: 907,471

[22] Filed: Jul. 1, 1992

[30] Foreign Application Priority Data

Jul. 4, 1991 [JP] Japan .................................. 3-191021

[51] Int. Cl.$^5$ ......................... B60P 1/00; B65G 25/00; B66C 23/00

[52] U.S. Cl. .................................... 414/543; 414/908; 414/910; 414/560; 414/191; 212/199; 212/225

[58] Field of Search ........ 414/543, 541, 542, 266–269, 414/560–562, 496, 336, 342, 191, 347, 348, 352, 464, 505, 550, 555, 910–911, 908; 212/199, 220–221, 225, 242–243, 244

[56] References Cited

U.S. PATENT DOCUMENTS

| | | | |
|---|---|---|---|
| 1,023,006 | 4/1912 | Carriker | 212/199 |
| 2,101,839 | 12/1937 | Crawford | 212/255 |
| 2,735,538 | 2/1956 | Boehm | 414/911 |
| 2,763,383 | 9/1956 | McCoy | 414/910 |
| 3,176,861 | 4/1965 | Paul et al. | 414/543 |
| 3,598,251 | 8/1971 | Sieurin | 414/910 |
| 3,682,334 | 8/1972 | Breitfuss | 414/910 |
| 4,306,826 | 12/1981 | Detwiler | 414/910 |

FOREIGN PATENT DOCUMENTS

| | | | |
|---|---|---|---|
| 2002916 | 2/1969 | France . | |
| 923300 | 2/1955 | Germany | 414/267 |
| 1342281 | 1/1974 | United Kingdom | 414/543 |
| 667488 | 6/1979 | U.S.S.R. | 414/543 |

*Primary Examiner*—Michael S. Huppert
*Assistant Examiner*—R. B. Johnson
*Attorney, Agent, or Firm*—Lowe, Price, LeBlanc & Becker

[57] ABSTRACT

A mobile cart for moving coil-shaped objects has a wheel-mounted horizontal base which supports an upwardly extending mast provided with a guideway along which a first support element is controllably movable up and down in a vertical direction above the base. A second support element is pivotably mounted at a proximate end to the first support element, and provides a horizontal guideway along which is suspended a downwardly depending clamp. On the base of the cart there is also provided an object support which, between two quarter-cylinder shaped horizontal support elements, has a gap of selected size. The clamp is operable to grasp a coil-shaped object, after which the first and second support elements are guidably moved upward, and the object supported by the clamps is horizontally moved to the object support. Lower distal end portions of the clamp slide into the gap and the coil-like object is lowered to rest on and be supported by an upper portion of the object support. More than one coil-like object may be supported and selectively accessed by rotating the object support about a vertical support thereof.

6 Claims, 5 Drawing Sheets

PARCEL CART FOR COIL-SHAPED OBJECTS

FIELD OF THE INVENTION

This invention relates to a cart for convenient loading, unloading and transportation of coil-shaped objects, and more particularly for transporting and delivering a plurality of lengths of coiled materials.

BACKGROUND OF THE PRIOR ART

Manufacturing often requires the provision of a length of a material, preferably unwound from a coil of the material, for processing thereof. Such material coils, or coil-like objects, are conventionally lifted and/or moved by ceiling cranes, forklifts, or the like. Where manufacturing production runs vary in duration, operators of such machines must frequently exchange coils of materials to be used, e.g., in presses or the like, quite frequently. Delays in performing such exchanges can increase the cost of production of the goods being manufactured from the coiled material.

Typically, with the use of a ceiling crane or a forklift, a coil is removed from the material supply unit of a machine, moved to a position where it may be stored or where a replacement supply of coiled material is available, and a replacement coil of the material is transported to the material supply unit for use in further manufacture. The conventional technique, using ceiling cranes and/or forklift trucks, often takes a long time and slows down production and increases costs.

There is, therefore, a perceived need for apparatus which enables the easy loading, unloading and transportation of coiled materials or coil-like objects. The present invention addresses this need.

SUMMARY OF THE INVENTION

It is a principal object of this invention to provide apparatus for loading, unloading and transporting a coil-like object, e.g., a coil of a length of material, which has a central opening.

A further object of this invention is to provide mobile apparatus which includes cooperating elements for loading, unloading, selectively moving and transporting one or more coil-like objects each of which has a central opening.

These and other related objects are realized by providing a mobile apparatus for selectively loading, unloading and transporting an object having a central opening. The apparatus includes a mobile and steerable base. On this base is mounted an upwardly extending first support means for providing support to the object while the object is being loaded and unloaded, the first support means being formed to have a vertical guideway. A second support means is pivotably mounted to the first support means to be movable in correspondence with the vertical guideway thereof, and provides support to the object as it is being loaded or unloaded, the second support means including a horizontal guideway extending over the base. An object lifting means of predetermined width is movably mounted to the second support means to be movable relative thereto in correspondence with the horizontal guideway thereof. The object lifting means engages and disengages with the object to enable selective loading and unloading thereof. An object support is mounted to and above the base to support a loaded object, and has an upper portion shaped and sized to be received within the central opening of the object. The upper portion of the object support has a gap sized and shaped to allow free movement of a portion of the object lifting means into and out of the gap to facilitate loading and unloading of the object to and from the object support.

A detailed description of the invention follows, and is best understood by reference to the drawing figures provided herewith as described immediately below.

DETAILED DESCRIPTION OF DRAWING

DETAILED DESCRIPTION OF THE PREFERRED EMBODIMENTS

Figure 1:
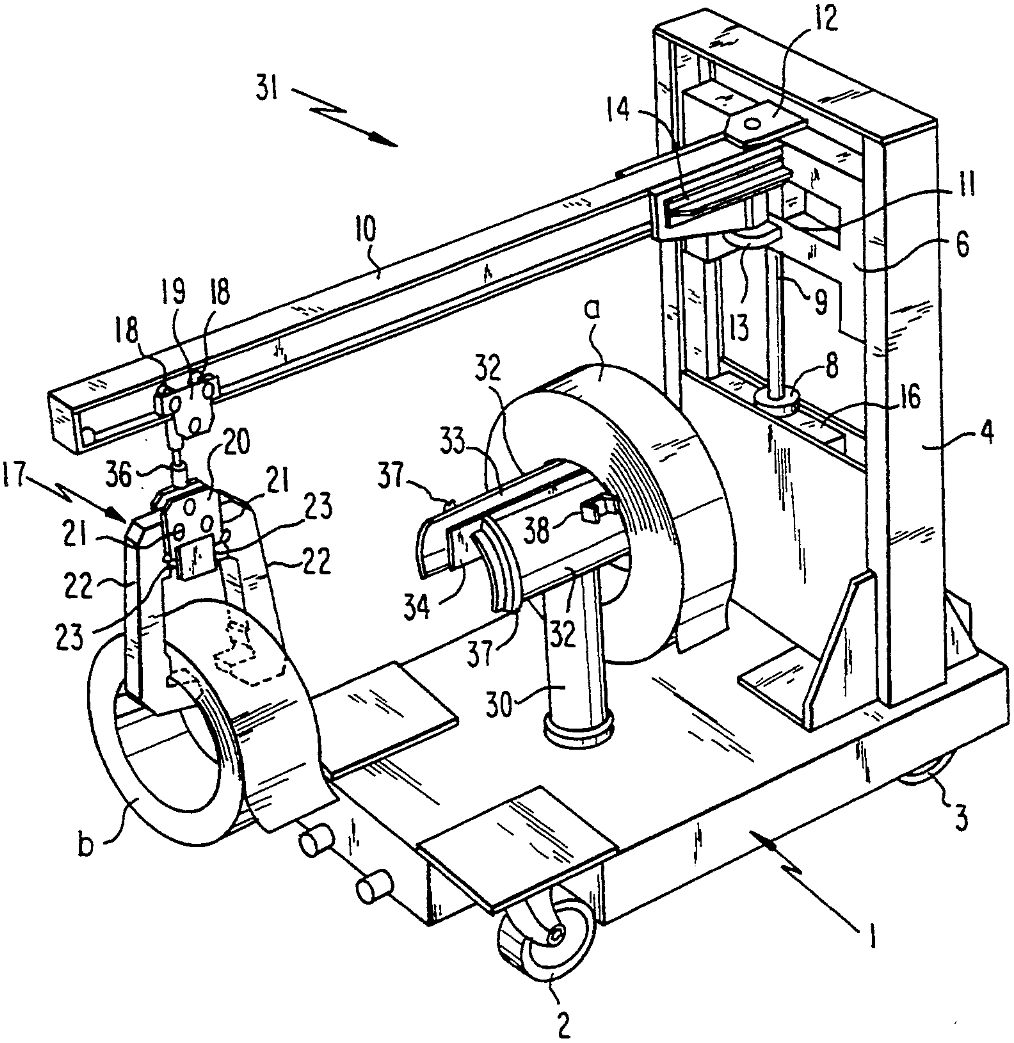
FIG. 1 is a perspective view of the invention according to a preferred embodiment, and is shown supporting two coiled objects.

As best seen in FIG. 1, in a preferred embodiment of the apparatus 31 a generally horizontal base 1 is supported on a plurality of wheels 2 and 3. As shown in FIG. 1, some of the wheels, e.g., wheels 2, may be mounted to swiveled supports (not numbered). The key is that base 1 has a horizontal expanse to which various other elements are mounted, and is itself mobile on its wheels.

To an upper surface of horizontal base 1, and adjacent a rear end thereof, there is mounted an upright gate-shaped mast 4. As best understood with reference to FIG. 4, two upright guide rails 5,5 are formed to run upwardly along the insides of the left and right sides of mast 4 and provide a vertical guideway.

Figure 4:
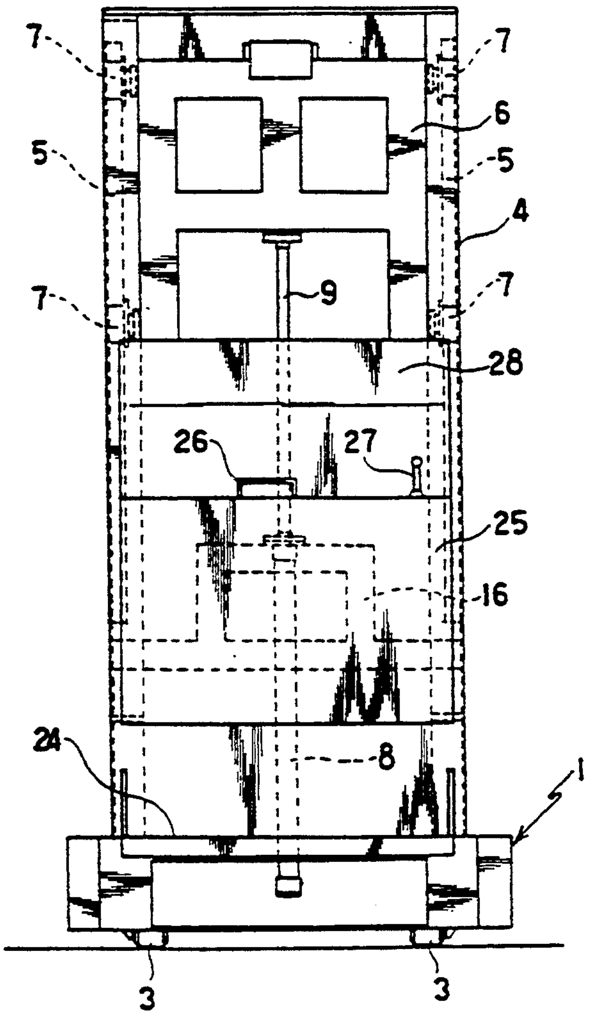
FIG. 4 is a rear elevation view of the embodiment per FIGS. 1–3.
Figure 5:
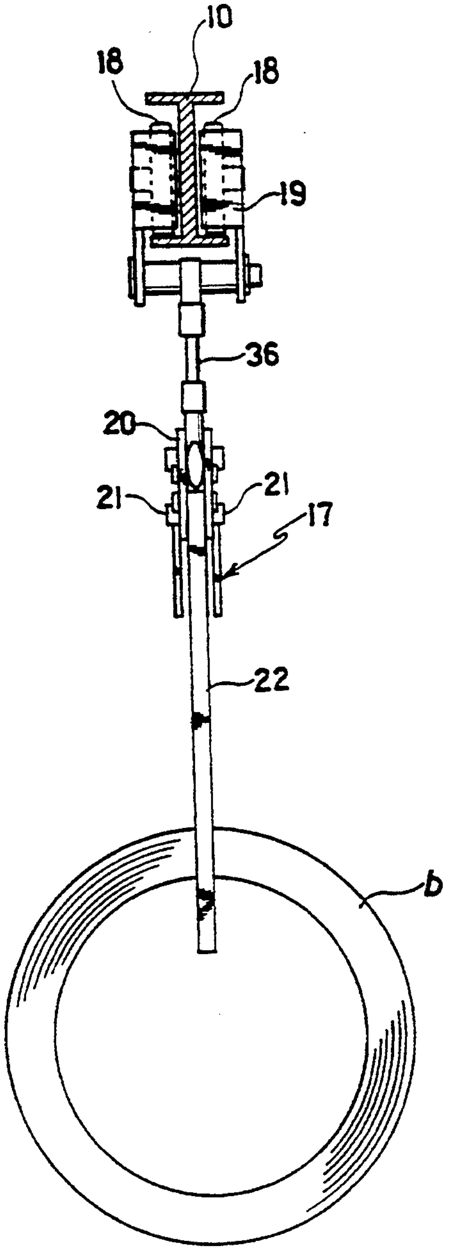
FIG. 5 is an enlarged view of a portion of the apparatus according to FIG. 1.

A slidable element 6 is disposed to be guided vertically, in an up-and-down motion, by and between guide rails 5,5 within mast 4. Element 6 may be provided with a plurality of end rollers 7, as best seen in FIG. 4, to facilitate such vertical movement guided by guide rails 5. Such vertical movement is obtained by actuation of a piston 9 contained in a cylinder 8, as best seen in FIG. 1. Piston 9 in cylinder 8 is operable to controllably move element 6 vertically between guide rails 5,5.

To vertically movable element 6 are provided upper and lower shaft holder pieces 12 and 13 between which extends a horizontal support element 11 to which is mounted an elongate, preferably I-beam support element 10. As will be appreciated, elongate support element 10 can thus swivel in a horizontal plane while being supported by support element 11 rotatably mounted between elements 12 and 13 which are themselves supported by vertically movable support element 6. In other words, elongate support element 11 is pivotable about its proximate end which is vertically movable by a corresponding movement of element 6 guided in guideways 5,5 and motivated by motion of piston 9.

Two elongate but relatively short arms 14,14 are provided to movable element 6 and are spaced so as to limit pivoting movement of elongate element 10. Inside each of these arms 14,14 are provided rubber stoppers 15, to resiliently limit angular motion of elongate element 10. This is best understood by reference to FIG. 3.

From a lower portion of elongate support element 10 is suspended a lifting tool 17, which depends downwardly from a trolley 19 mounted on rolling trolley wheels 18. Trolley 19 can thus be moved horizontally along a substantial length of elongate support element 10, and can thus horizontally carry lifting tool 17 therewith.

By cooperative operation of the above-described elements, suspending lifting tool 17 can be moved horizontally along elongate support element 10, elongate support element 10 can be swiveled in a horizontal plane between rubber stoppers 15, and can also be moved vertically by operation of hydraulic piston 9.

Since the coil-like objects (a) and (b) can be of substantial weight, a bracing part 16 may be provided between guide rails 5,5 within gate 4 to brace and support hydraulic cylinder 8 within which hydraulic piston 9 moves to raise support element 6 and the various loads thereof.

Suspended lifting tool 17 depends from trolley 19 via a downwardly depending element 36 which, at its lower and distal end supports a basic board 20 to which, via axle holes 21, are provided pivot supports for pivotally opposed clamps 22,22. An elastic stay 23 is preferably disposed below axle holes 21,21 to elastically limit the opening and closing movements of clamps 22,22. The lower distal ends of clamps 22,22 are formed to extend horizontally into a central opening of a coil-like object, e.g., "b" in FIG. 1, to conveniently lift the same.

Figure 3:
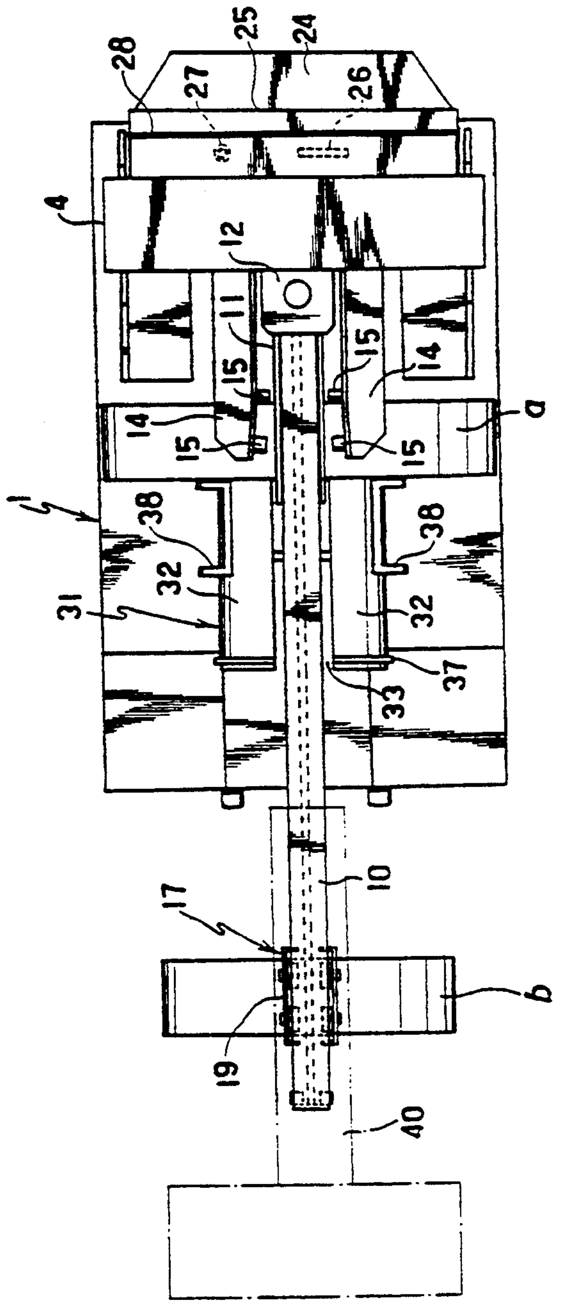
FIG. 3 is a plan view of the embodiment according to FIGS. 1 and 2.

At the rear of base 1, as best understood with reference to FIG. 3, an operator support is provided in the form of step board 24. A control box 25 is provided adjacent thereto. The operator may thus stand on step board 24 and can hold on to a hand rail 26 close to control box 25 and preferably operate a joy stick 27 to control the direction and speed of travel of the apparatus. The operator thus supports himself on the step board by holding on to hand rail 26 with one hand, while controlling the movement of the cart with the other by operating joy stick 27. To further protect the operator, a cover board 28, best seen in FIG. 3, may be provided.

Figure 2:
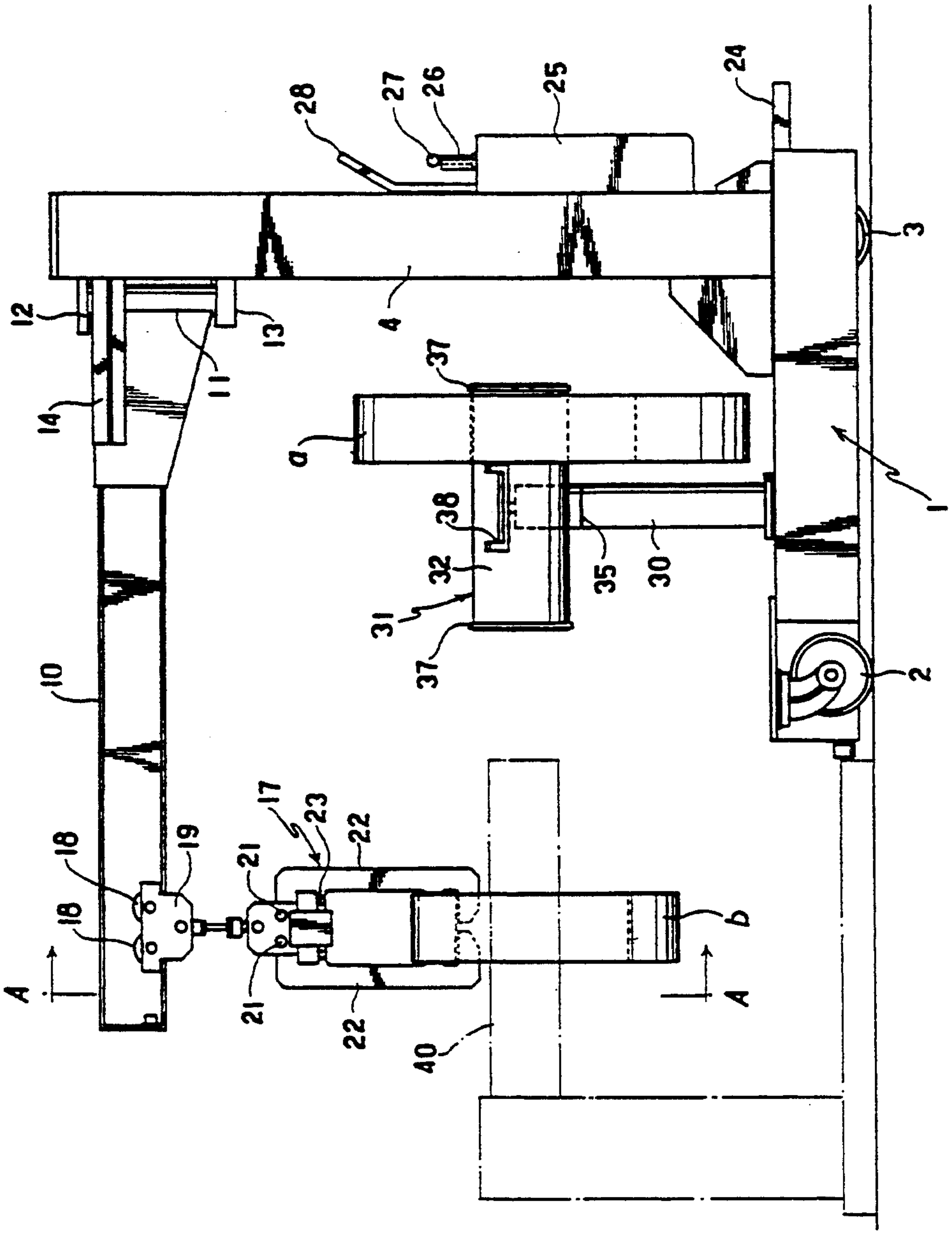
FIG. 2 is a side elevation view of the preferred embodiment according to FIG. 1.

Also, as best seen in FIGS. 1 and 2, an upright cylindrical support 30 is mounted in front of mast 4 above base 1. A loading table 31, as best seen in FIG. 1, is formed of two quarter-cylindrical elements disposed on opposite sides of a support 34 and spaced therefrom by respective spaces 33,33. FIG. 1 illustrates how one coil-like object, e.g., a coil "a" comprising a length of elongate material, may thus be supported on upper portions of the quarter-cylindrical elements 32,32. Note that these quarter-cylindrical elements 32,32 are mounted to vertical cylindrical support 30 so as provide room on opposite sides to conveniently support one coil-like object on each side of cylindrical support 30.

Referring now to FIG. 2, it will be understood how suspended tool 17, with clamps 22 closed with their respective lower most ends extending into a central hole of a coil-like object "b" may be used to lift such an object from a stationary horizontal support element 40. The operator operating joy stick 27 controls the direction and acceleration of the rear wheels 3. The lifted object may be moved horizontally by rolling action of wheels 18 along a lower flange of horizontal support element 10 to bring the coil-like object toward vertical cylindrical support 30. As will be readily understood, the leftwardly extending distal portions of quarter-cylindrical elements 32,32 may then be extended inwardly into the central opening of an object such as "b" by rightward movement of suspended lifting tool 17 per FIG. 2. Then, by gently lowering the vertically movable element 6, the operator can lower object "b" so that it rests on upper portions of the quarter-cylindrical elements 32,32. During this operation, the lower-most distal end portions of clamps 22 would be able to pass within one of the spaces 33,33 without interference.

As will also be readily understood by reference to FIGS. 1 and 2, the loading table 31 can be rotated about a vertical axis while supported on cylindrical support 30. Fall-prevention ribs 37,37 are respectively provided at the extreme distal end portions of the quarter-cylindrical elements 32,32. This is best seen in FIGS. 1 and 2, and serve retain the objects "a" and "b" as loading table 31 is turned about a vertical axis at the top of vertical support 30. In this manner, two coils are supported on loading table 31 and the operator can access either one conveniently within the bounds of the apparatus.

As will be appreciated from the above description, a single operator can, by a simple operation, readily lift at least two coil-like objects to and from the apparatus and, depending on the need, can then easily operate joy stick 3 to move the entire apparatus with the coils to a selected location. The entire apparatus is essentially self-contained, compact and highly maneuverable.

In the above-described preferred embodiment, as clearly illustrated in FIGS. 1–4, the horizontal support element 10 has the form of a conventional I-beam. However, persons of ordinary skill in the art will readily appreciate that this horizontal support could also have, for example, the form of a hollow tube. Likewise, instead of being supported on a plurality of wheels 2 and 3, some of which are swiveled, the entire apparatus could be provided with wheels which run along conventional rails. Even further, the coil-like objects may comprise coils of an element of round cross-section instead of the flat cross-section of the example illustrated in FIG. 1.

In summary, the above-described apparatus can be readily operated by a single operator to lift and load onto the loading table 31 one or more coil-like objects, thereafter selectively unload one or more of such objects and, as desired, transport such objects from one location to another.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A mobile apparatus for selectively loading, unloading and transporting an object having a central opening, comprising:

a mobile and steerable base supported on two driven wheels and two steerable wheels;

first support means, mounted to said base and extending upwardly thereof, for providing support to said object while said object is being loaded and unloaded, said first support means being formed to have a vertical guideway;

second support means, mounted to said first support means to be movable along said vertical guideway, for providing support to said object during loading and unloading thereof, said second support means including a horizontal guideway extending over said base, wherein said second support means comprises an elongate horizontal element having a distal end and a proximate end, the second support means being pivotally supported at the proximate end of the elongate horizontal element to said first support means so as to be vertically moveable thereby;

pivoting-limiting means mounted to said first support means to limit pivoting movement of said horizontal element of said second support means within predetermined limits;

an object lifting means mounted to said second support means to be movable relative thereto along said horizontal guideway, for engaging and disengaging with the object to enable selective loading and unloading of said object; and an object support mounted to and above said base to support a loaded object, said object support having an upper portion shaped and sized to be received within said central opening of said object, said upper portion having a gap sized and shaped to allow free movement of a portion of the object lifting means in and out of said gap to facilitate loading and unloading of said object to and from said object support, wherein said object support comprises two quarter-cylindrical horizontal elements disposed to define said gap therebetween.

2. The mobile apparatus according to claim 1, further comprising:

operator support means mounted to a rear end portion of said base for supporting an operator thereon; and control means disposed to be operated by said operator supported on said operator support means.

3. The mobile apparatus according to claim 1, wherein:

said first support means comprises piston and cylinder means for enabling movement of said object up and down in a vertical direction.

4. The mobile apparatus according to claim 1, wherein:

the pivoting-limiting means comprises rubber stoppers disposed on opposite sides of said horizontal support element adjacent the proximate end thereof.

5. The mobile apparatus according to claim 1, wherein:

said object lifting means comprises downwardly depending clamp means provided with lateral end portions extendable into said central opening of the object to enable lifting of the object.

6. The mobile apparatus according to claim 5, wherein:

said object lifting means comprises means for limiting opening and closing of said clamp means.

* * * * *